(12) United States Patent
Pryzby et al.

(10) Patent No.: US 8,747,223 B2
(45) Date of Patent: Jun. 10, 2014

(54) WAGERING GAME SYSTEM WITH INDEPENDENT VOLUME CONTROL

(75) Inventors: Eric M. Pryzby, Skokie, IL (US); Paul Radek, Naperville, IL (US)

(73) Assignee: WMS Gaming Inc., Waukegan, IL (US)

( * ) Notice: Subject to any disclaimer, the term of this patent is extended or adjusted under 35 U.S.C. 154(b) by 1847 days.

(21) Appl. No.: 12/063,367

(22) PCT Filed: Aug. 17, 2006

(86) PCT No.: PCT/US2006/032123
§ 371 (c)(1),
(2), (4) Date: Feb. 8, 2008

(87) PCT Pub. No.: WO2007/022343
PCT Pub. Date: Feb. 22, 2007

(65) Prior Publication Data
US 2008/0194319 A1    Aug. 14, 2008

Related U.S. Application Data

(60) Provisional application No. 60/708,943, filed on Aug. 17, 2005.

(51) Int. Cl.
*A63F 13/02*    (2006.01)
(52) U.S. Cl.
CPC .......... *A63F 13/02* (2013.01); *A63F 2300/6063* (2013.01)
USPC .......................................................... 463/35
(58) Field of Classification Search
CPC ......... G06F 3/162; G06F 3/165; G06F 3/167; G06F 17/3074; G06F 17/30743; G06F 17/30749; G06F 17/30755; G06F 17/30778; H04R 5/04; A63F 2300/8047; A63F 2300/6018; A63F 2300/6063; A63F 9/247; A63F 9/2476; A63F 9/2477
USPC ................ 463/35, 16, 20, 46, 47; 340/392.3; 455/355, 219, 233.1, 234.1–253.2, 455/177.1, 200.1; 984/354; 84/633, 665, 84/711, 741; 379/388.05; 381/57, 102, 381/104, 105, 106, 107, 109, 2, 11; 348/481, 483, 485; 704/E19.005; 386/97
See application file for complete search history.

(56) References Cited

U.S. PATENT DOCUMENTS

| | | | | |
|---|---|---|---|---|
| 5,052,685 A | * | 10/1991 | Lowe et al. | 463/35 |
| 5,754,660 A | * | 5/1998 | Shimizu | 381/17 |
| 5,902,115 A | * | 5/1999 | Katayama | 434/307 A |
| 6,544,122 B2 | * | 4/2003 | Araki et al. | 463/35 |

(Continued)

OTHER PUBLICATIONS

"International Search Report for Application No. PCT/US2006/032123, date mailed Mar. 8, 2007", 4 pgs.

(Continued)

*Primary Examiner* — David L Lewis
*Assistant Examiner* — Matthew D Hoel
(74) *Attorney, Agent, or Firm* — Nixon Peabody LLP

(57) ABSTRACT

A computerized wagering game system includes a gaming module comprising gaming code which is operable when executed on to conduct a wagering game on which monetary value can be wagered, and an audio system operable to play a first type of sounds at a volume regulated by a master volume control and operable to play a second type of sounds not regulated by the master volume control.

19 Claims, 3 Drawing Sheets

(56) References Cited

U.S. PATENT DOCUMENTS

| | | | |
|---|---|---|---|
| 6,584,201 B1* | 6/2003 | Konstantinou et al. | 381/57 |
| 6,599,195 B1* | 7/2003 | Araki et al. | 463/43 |
| 6,827,648 B2* | 12/2004 | Peng et al. | 463/36 |
| 6,945,871 B2* | 9/2005 | Uenishi et al. | 463/35 |
| 8,184,824 B2* | 5/2012 | Hettinger et al. | 381/77 |
| 2001/0014621 A1* | 8/2001 | Okubo et al. | 463/35 |
| 2003/0013533 A1* | 1/2003 | Uenishi et al. | 463/43 |
| 2003/0119575 A1* | 6/2003 | Centuori et al. | 463/20 |
| 2004/0209689 A1* | 10/2004 | Peng et al. | 463/37 |
| 2008/0139312 A1* | 6/2008 | Okada | 463/35 |

OTHER PUBLICATIONS

"Written Opinion of the International Searching Authority for Application No. PCT/US2006/032123, date mailed Mar. 8, 2007", 5 pgs.

* cited by examiner

WAGERING GAME SYSTEM WITH INDEPENDENT VOLUME CONTROL

RELATED APPLICATIONS

This application is a U.S. National Stage Filing under 35 U.S.C. 371 from International Patent Application Serial No. PCT/US2006/032123, filed Aug. 17, 2006, and published on Feb. 22, 2007 as WO 2007/022343 A2, and republished as WO 2007/022343 A3, which claims the priority benefit of U.S. Provisional Application Ser. No. 60/708,943, filed Aug. 17, 2005, the contents of which are incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

FIELD OF THE INVENTION

The invention relates generally to computerized wagering game machines, and more specifically to selectable audio topologies in a computerized wagering game machine.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio and video features into wagering games to present the wagering game, to provide help, and to enhance the environment presented are therefore important elements in the attractiveness and commercial success of a computerized wagering game system. It is not uncommon for audio voices to provide instruction and help, and to provide commentary on the wagering game being played. Music and environmental effects are also played through speakers in some wagering game systems to enhance or complement a theme of the wagering game. These sounds typically accompany video presentation of the wagering game on a screen, which itself often includes animation, video, and three-dimensional graphics as part of presentation of the wagering game.

Wagering game machines can be installed in a variety of environments, from noisy casinos or other wagering game establishments to quiet cafes or exclusive gaming areas. The volume of sound produced by a wagering game is desirably adjustable to compensate for the environmental noise present, and is typically set as a master volume level that is some percentage of the full system volume. The system volume is the full volume the machine is capable of producing, while the master volume is an adjustable volume level that can be used to reduce wagering game sounds to some percentage of the available system volume.

But, in some instances it is not desirable to have sounds subject to the master volume setting. For example, when a jackpot occurs and a slot attendant is needed to confirm and pay out the jackpot, there is typically no cause to limit the volume or attention drawn by the slot machine. Similarly, when a tilt condition occurs such as when a machine malfunctions, a door opens, or another problem occurs, it may not be desirable to restrict the volume of a tilt sound to the volume specified by the master volume.

It is therefore desired to be able to control volume for some events independent of a master volume level.

SUMMARY

One example embodiment of the invention comprises a computerized wagering game system including a gaming module comprising a processor and gaming code which is operable when executed on the processor to conduct or present a wagering game on which monetary value can be wagered. The wagering game system includes an audio system operable to play a first type of sounds at a volume regulated by a master volume control, and operable to play a second type of sounds not regulated by the master volume control. In further embodiments, at least one of the first or second types of sounds are identified via a topology marker embedded in an audio file containing the sound.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

The invention in one example embodiment comprises a computerized wagering game system including a gaming module comprising a processor and gaming code which is operable when executed on the processor to conduct or present a wagering game on which monetary value can be wagered. The wagering game system includes an audio system operable to play a first type of sounds at a volume regulated by a master volume control, and operable to play a second type of sounds not regulated by the master volume control. In further embodiments, at least one of the first or second types of sounds are identified via a topology marker embedded in an audio file containing the sound.

Figure 1:
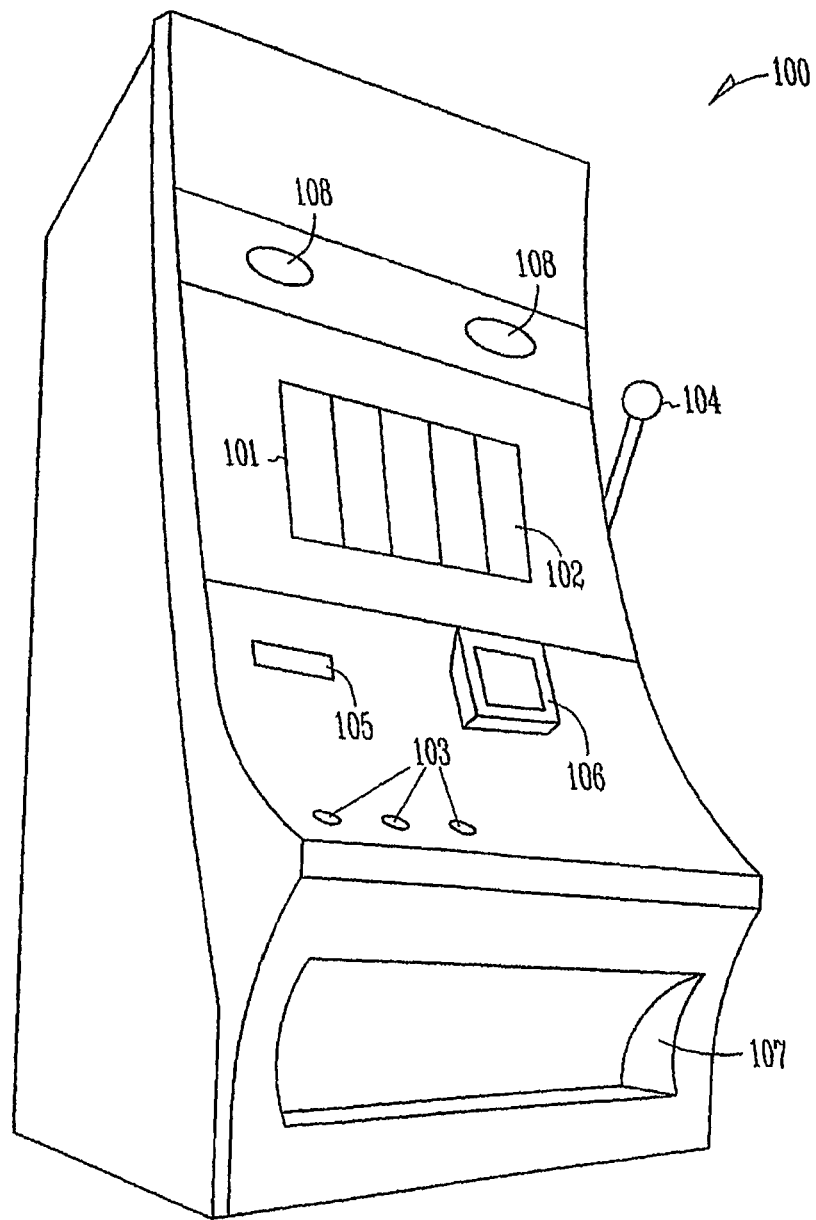
FIG. 1 shows a computerized wagering game machine, as may be used to practice some example embodiments of the present invention.

FIG. 1 illustrates a computerized wagering game machine, as may be used to practice some embodiments of the present invention. The computerized gaming system shown generally at 100 is a video wagering game system, which displays information for at least one wagering game upon which monetary value can be wagered on video display 101. Video display 101 is in various embodiments a CRT display, a plasma display, an LCD display, a surface conducting electron emitter display, or any other type of display suitable for displaying electronically provided display information. Alternate embodiments of the invention will have other game indicators, such as mechanical reels instead of the video graphics reels shown at 102 that comprise a part of a video slot machine wagering game.

A wagering game is implemented using software within the wagering game system, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold'em games. The wagering game is played and controlled with inputs such as various buttons 103 or via a touchscreen overlay to video screen 101. In some alternate examples, other devices such as pull arm 104 used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 105 or a secure user identification module interface 106, and winnings are returned via the returned value card or through the coin tray 107. Sound is also provided through speakers 108, typically including audio indicators of game play, such as reel spins, credit bang-ups, and environmental or other sound effects or music to provide entertainment consistent with a theme of the computerized wagering game. In some further embodiments, the wagering game machine is coupled to a network, and is operable to use its network connection to receive wagering game data, track players and monetary value associated with a player, and to perform other such functions. The wagering game system takes other forms in various further embodiments, such as a wireless, portable, or multi-function wagering game console. In other embodiments, a user-provided interface such as a Personal Digital Assistant (PDA) or cellular telephone are used as an interface to the wagering game, such as to receive game player input and forward it to other elements of the wagering game system and to present wagering game information to the player.

The audio channel is used to play a variety of sounds, such as attract mode sounds designed to attract potential wagering game players, multimedia sounds presented as part of an animation or video, sound effects, and wagering game sounds played to convey information regarding the wagering game. These examples of first types of sounds are desirably played at a level appropriate to the environment, such as being played at a relatively loud level in a noisy casino environment but at a relatively quiet level in a private or secluded wagering game. The volume level of such sounds is controlled in some embodiments by a master volume control, which allows a game administrator or technician to adjust the volume to a level appropriate to the environment. In a further example, a user volume control allows a wagering game player a limited range of adjustment relative to the master volume, so that each wagering game player can make minor adjustments to the volume level specified through the master volume setting.

But, certain alert or alarm sounds are desirably not subject to the master volume control. Examples of these second types of sounds include alarm sounds such as tilt condition sounds, door open sounds, or malfunction sounds, and alert sounds such jackpots, progressive area jackpots, and sounds alerting a wagering game player to a left ticket or game player identification card. These sounds are desirably played at a volume level that cannot be reduced using a master volume control or system volume control, but are of such relative importance or infrequent occurrence that the sounds are desirably played at a loud enough level to attract the attention of those in the vicinity of the wagering game system.

Figure 2:
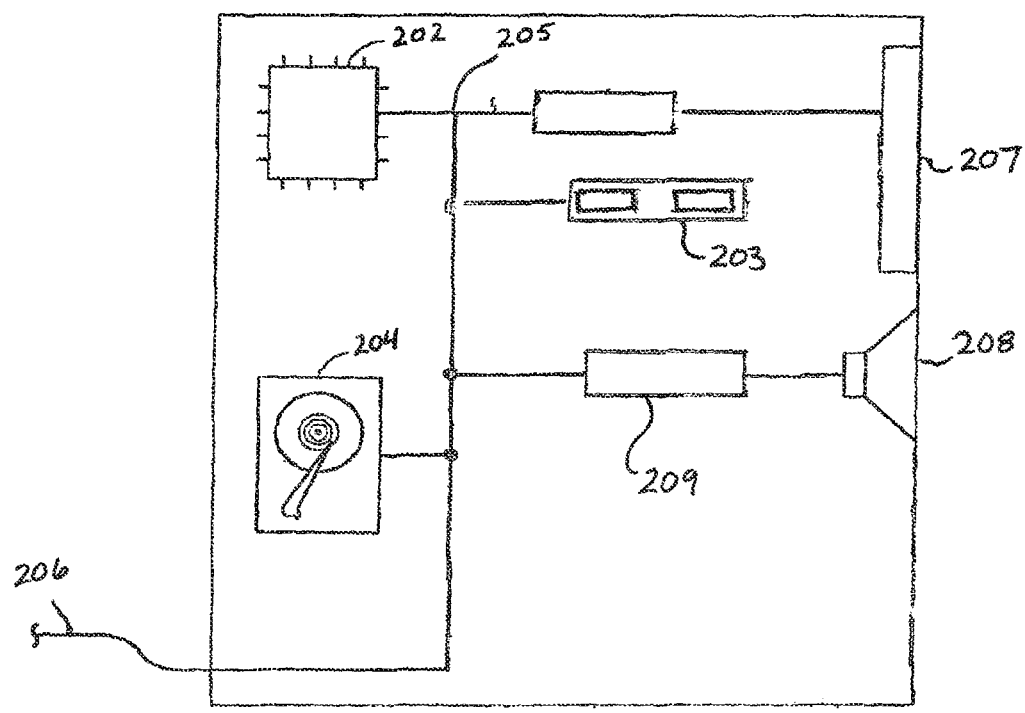
FIG. 2 is a block diagram of a wagering game system, consistent with some example embodiments of the present invention.

FIG. 2 is a block diagram of a computerized wagering game system operable to practice various embodiments of the invention. The system 201 has a processor 202 that is operable to load software into memory 203 from nonvolatile storage such as hard disk drive 204 or nonvolatile memory, and to execute the software. The various components are coupled by a bus 205, which also couples the processor to a network connection 206, a touchscreen liquid crystal display 207, and one or more speakers 208. The speakers 208 are coupled via an audio adapter 209, operable to receive incoming digital sound information and to output a sound signal as an electrical signal the speaker 208 is able to convert into audio. The speaker's volume is controlled in various embodiments by the audio adapter or by other such components of the audio system that are able to regulate the electrical signal provided to the speaker 208. This is achieved in some examples by mathematically scaling the sound amplitudes described in a digital sound signal, and is achieved in other embodiments by inserting an electrical impedance such as a resistor or potentiometer into the electrical path the sound signal takes in reaching the speaker 208.

The master volume control is used to adjust the level of the first type of sounds in some example embodiments, including sounds such as attract mode sounds designed to attract potential wagering game players, multimedia sounds presented as part of an animation or video, sound effects, and wagering game sounds played to convey information regarding the wagering game. These sounds convey information to the wagering game player, but are not of such high importance that their volume should be unrestricted. The master volume therefore enables a wagering game administrator or technician to limit the volume of such sounds, such as by setting a volume level using a configuration screen displayed on the touchscreen display 207 or by setting a mechanical volume control protected within the locked wagering game machine cabinet. Other sounds, such as alarm sounds including tilt condition sounds, door open sounds, or malfunction sounds, and alert sounds such jackpots, progressive area jackpots, and sounds alerting a wagering game player to a left ticket or game player identification card, are desirably played at the full available volume due to the significance of the information they convey. These sounds of a second type are therefore not limited by the master volume in some embodiments, but are played at a full system volume level.

The first type of sounds are further limited in some embodiments by a user volume control, which provides the user the ability to increase or reduce the volume by a limited amount. For example, even when a master volume level is set appropriately for a given environment, a user may wish to decrease the volume somewhat during quiet morning hours or increase the volume somewhat during noisy evening hours on weekends. A particular user's sensitivity to loud sounds or hearing capability may also lead the player to prefer a volume level other than a preselected master volume. While the first type of sounds are adjustable using the user volume control, the second type of sounds are in some embodiments not subject to the user volume control, so that the sounds such as alerts and alarms of the second type are not quieted by user actions.

The second type of sounds are in some embodiments of the invention still subject to some volume regulation, such as a specified percentage of full system volume not determined by the master volume. For example, a game that has shut itself down and is attempting to attract a game attendant for service may play an alert sound at only 70% of full volume, while a tilt condition or jackpot may be played at 100% of full system volume.

In some further embodiments, the second type of sounds include a variety of alert or award sounds, such as relatively large credit wins such as may be realized as a result of a certain reel symbol combination in a reel slot game. The second type of sounds also include bonus-related sounds in some embodiments, such as sounds attached to the appearance of a bonus trigger symbol on a reel slot base game or on a bonus game reel, and sounds indicating transition from one part of the game to another such as when entering or leaving a bonus round. Similarly, sounds that indicate the beginning of bonus round play, continuation or extension of a bonus round, conclusion of a bonus round, and display of final credits accumulated during a bonus round can be indicated using the second type of sounds so that the volume and excitement of the bonus round remains high whatever the master or user volume settings. Such bonus rounds take place in the main game cabinet as shown in FIG. 1, in a top box, or in another external device such as a separate controller in various embodiments. Sounds signifying other player wins or events are presented as the second type of sound in some further embodiments, such as winning via a specific game result, winning a network bonus, local or wide-area progressive wins, and total or net winning accumulation.

Figure 3:
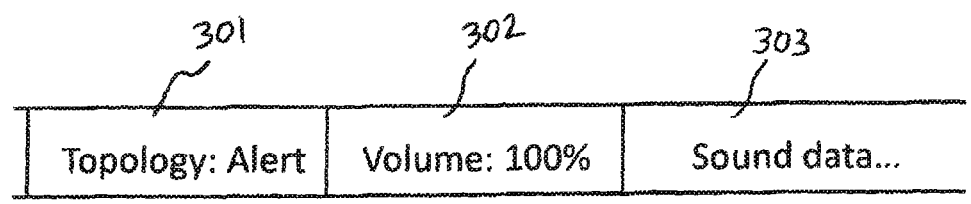
FIG. 3 illustrates an audio data file containing markers, consistent with an example embodiment of the invention.

An indication of whether a sound is of the first or second type, the percentage of full volume the sound is played, and other information are contained in some example embodiments as markers within the audio file containing the sound. FIG. 3 illustrates an example of such an audio data file. The topology marker 301 indicates that the sound is an alert sound, and is to be played such that it is not subject to a master or user volume setting. The volume marker 302 indicates that this particular sound is to be played at 100% of full system volume, and the numerically encoded sound data itself follows at 303. Such a system enables an audio system to efficiently process and play a wide variety of sounds, and provides a framework in which a wagering game system developer can produce, incorporate, and replace sounds easily. Such a system of markers is more fully described in U.S. patent application "Audio Markers in a Computerized Wagering Game Machine", filed Oct. 1, 2004, Ser. No. 60/615,564, which is hereby incorporated for reference.

Figure 4:
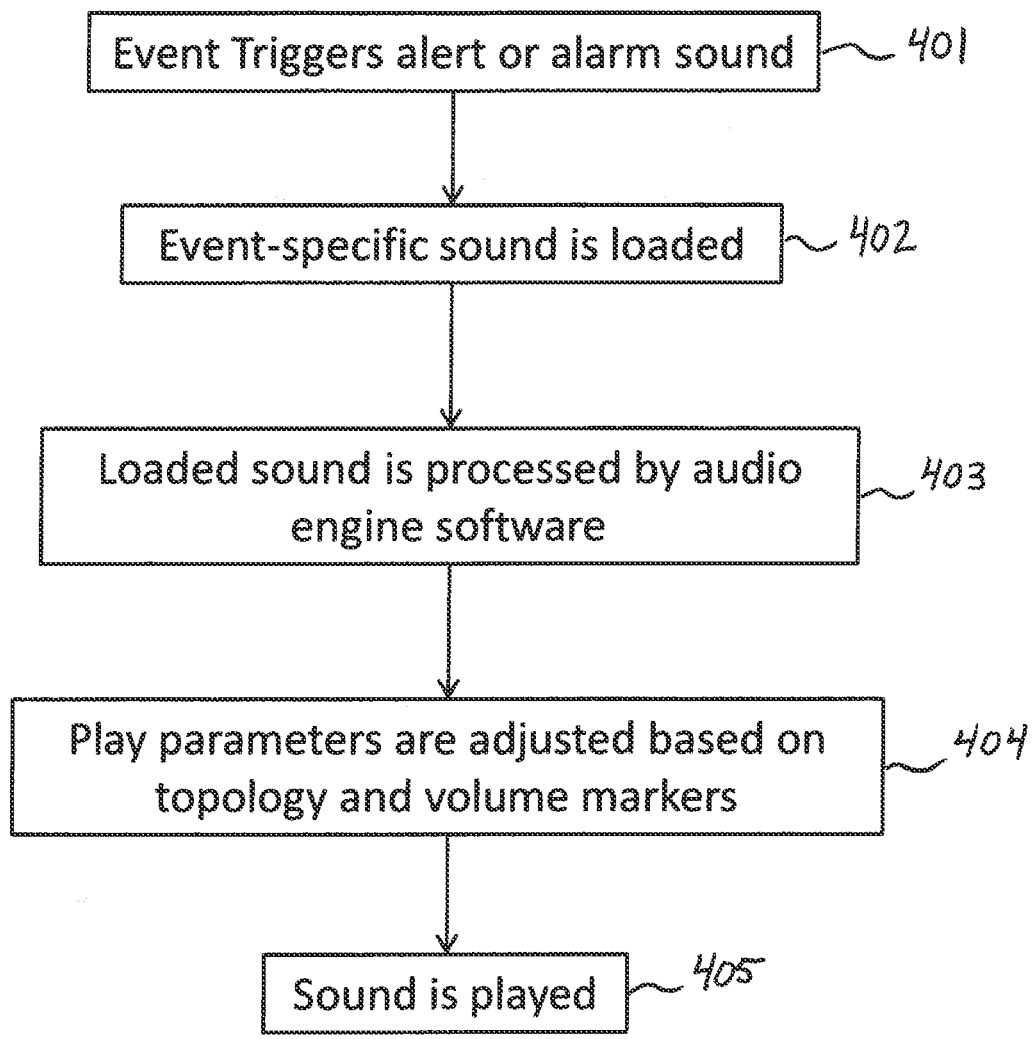
FIG. 4 shows a method of operating a wagering game system, consistent with an example embodiment of the invention.

FIG. 4 shows an example method of operating a wagering game system, consistent with an example embodiment of the invention. The wagering game system detects an event that triggers an alert or alarm sound at 301. The event can include detection of various physical events, such as a tilt, a door opening, or a user's ticket or card left in the wagering game machine, as well as electronic events such as awarding a jackpot or a wagering game malfunction. The event is detected by the hardware or software within the wagering game system, and an associated sound specified in the software or configuration is loaded at 402. The event-specific sound loaded at 402 is in some embodiments a part of the software executing on the wagering game system, and in other embodiments is specified in a configuration file or in other hardware or software.

The loaded sound file is processed in the audio engine software at 403, which is operable to read the markers embedded in the sound file such as are shown in FIG. 3. The audio engine loading the file of FIG. 3 sees that the file is an alert file, and that it is to be played back at 100% of system volume. Playing parameters are adjusted based on the topology and volume markers at 404, and the sound is played at 405. The sound is in this example therefore played at 100% of system volume, and is not subject to the master or user volume controls because it is processed as an alert type of sound based on its topology marker.

In further embodiments, other markers are used and will affect playback, or other playback parameters are set using the markers indicated in FIG. 3. For example, some audio files may use markers to indicate a rhythm or synchronization point within the sound that can be used to coordinate or time the playback of certain sounds, while other audio files such as alert or alarm sounds are always to be played immediately.

The examples presented here illustrate a variety of ways in which use of an audio system to play a first type of sounds at a volume regulated by a master volume control and a second type of sounds not regulated by the master volume control can be implemented, including use of markers such as topology alert or alarm markers, application of volume controls in an audio engine within the wagering game system software architecture, and incorporation of a user volume control into the audio system. These examples illustrate how certain sounds can be played at a volume not regulated by master or user volume control, so that the attention the sounds attract is not restricted by the sound configuration applied during normal game play.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computerized wagering game system comprising:
   a gaming module comprising gaming code which is operable to present a wagering game on which monetary value can be wagered; and
   an audio system including one or more audio speakers and a master volume control, the audio system operable to play first type sounds and second type sounds, the first and second sounds being related to one or more states of the game system, and wherein, when the first and second type sounds are played either separately or concurrently through the same one or more audio speakers, the first type sounds are regulated by the master volume control and the second type sounds are not regulated by the master volume control, and wherein the master volume control is adjustable via at least one of a computerized configuration parameter and a mechanical volume control and is accessible to a wagering game technician but not accessible to a wagering game user.

2. The computerized wagering game system of claim 1, wherein the first type sounds comprise at least one of wagering game play sounds, music, attract mode sounds, and multimedia sounds.

3. The computerized wagering game system of claim 1, wherein the second type sounds comprise at least one of tilt condition sounds, jackpot sounds, alert sounds, and alarm sounds.

4. The computerized wagering game system of claim 1, wherein at least one of the first type sounds and second type sounds is identified via a topology marker embedded in an audio file containing the sound.

5. The computerized wagering game system of claim 1, wherein the first type sounds are further regulated by a user volume control, and the second type sounds are not regulated by the user volume control.

6. The computerized wagering game system of claim 1, wherein the second type sounds not regulated by the master control are played at a specified percentage of a maximum system volume.

7. The computerized wagering game system of claim 6, wherein the specified percentage of the maximum system volume is specified via a marker in an audio file containing the second type sounds.

8. A computer-implemented method of operating a computerized wagering game system, the method comprising:
   presenting, via one or more processors and on at least one display device, a wagering game upon which monetary value can be wagered; and
   playing first type sounds and second type sounds through an audio system, the audio system including one or more audio speakers and a master volume control, the first and second type sounds being related to one or more states of the game system, and wherein, when the first and second type sounds are played either separately or concurrently through the same one or more audio speakers, the first type sounds are regulated by the master volume control and the second type sounds are not regulated by the master volume control, and wherein the master volume control is accessible to a wagering game technician for adjustment but not accessible to a wagering game user.

9. The method of operating a computerized wagering game system of claim 8, wherein the first type sounds comprise at least one of wagering game play sounds, music, attract mode sounds, and multimedia sounds, and wherein the second type sounds comprise at least one of tilt condition sounds, jackpot sounds, alert sounds, and alarm sounds.

10. The method of operating a computerized wagering game system of claim 8, wherein at least one of the first type sounds and second type sounds is identified via a topology marker embedded in an audio file containing the sound.

11. The method of operating a computerized wagering game system of claim 8, wherein the first type sounds are further regulated by a user volume control, and the second type sounds are not regulated by the user volume control.

12. The method of operating a computerized wagering game system of claim 8, wherein the second type sounds not regulated by the master control are played at a specified percentage of a maximum system volume, the specified percentage being specified via a marker in an audio file containing the second type sounds.

13. The method of operating a computerized wagering game system of claim 8, wherein the master volume is adjustable via at least one of a computerized configuration parameter and a mechanical volume control accessible to a wagering game technician but not accessible to a wagering game user.

14. A machine-readable, non-transitory medium with instructions stored thereon, the instructions, when executed by one or more processors, causing a computerized game system to perform a method comprising:
   presenting, via at least a one display device, a wagering game upon which monetary value can be wagered; and
   playing first type sounds and second type sounds through an audio system, the audio system including one or more audio speakers and a master volume control, the first and second type sounds being related to one or more states of the game system, and wherein, when the first and second type sounds are played either separately or concurrently through the same one or more speakers, the first type sounds are regulated by a master volume control and the second type sounds are not regulated by the master volume control, and wherein the master volume control is accessible to a wagering game technician for adjustment but not accessible to a wagering game user.

15. The machine-readable medium of claim 14, wherein the first type sounds comprise at least one of wagering game play sounds, music, attract mode sounds, and multimedia sounds, and wherein the second type sounds comprise at least one of tilt condition sounds, jackpot sounds, alert sounds, and alarm sounds.

16. The machine-readable medium of claim 14, wherein at least one the first type of sounds and second type sounds is identified via a topology marker embedded in an audio file containing the sound.

17. The machine-readable medium of claim 14, wherein the first type sounds are further regulated by a user volume control, and the second type sounds are not regulated by the user volume control.

18. The machine-readable medium of claim 14, wherein the second type sounds not regulated by the master control are played at a specified percentage of a maximum system volume, the specified percentage being specified via a marker in an audio file containing the second type of sounds.

19. The machine-readable medium of claim 14, wherein the master volume is adjustable via at least one of a computerized configuration parameter and a mechanical volume control accessible to a wagering game technician but not accessible to a wagering game user.

* * * * *

UNITED STATES PATENT AND TRADEMARK OFFICE
CERTIFICATE OF CORRECTION

PATENT NO. : 8,747,223 B2
APPLICATION NO. : 12/063367
DATED : June 10, 2014
INVENTOR(S) : Eric M. Pryzby and Paul Radek It is certified that error appears in the above-identified patent and that said Letters Patent is hereby corrected as shown below:

In the Claims:

On Column 7, Line 12 (Claim 1, Line 8), please insert -- type -- between "second" and "sounds."

Signed and Sealed this
Twenty-third Day of September, 2014

Michelle K. Lee
*Deputy Director of the United States Patent and Trademark Office*